July 1, 1958

B. R. FIELDS 2,841,033

ACCELERATOR LIMIT CONTROL

Filed Aug. 2, 1956

INVENTOR
Bennett R. Fields

BY
Mason, Fenwick & Lawrence
ATTORNEYS

United States Patent Office 2,841,033
Patented July 1, 1958

2,841,033
ACCELERATOR LIMIT CONTROL

Bennett R. Fields, Farmville, N. C.

Application August 2, 1956, Serial No. 601,769

7 Claims. (Cl. 74—526)

This invention relates to automobile accelerator pedal controls and more particularly to means for limiting the amount of movement of such pedals and thereby limiting the amount of fuel which may be supplied to the automobile motor and, in effect, the maximum speed of the automobile.

Control mechanism for limiting the amount of fuel that may be supplied to the automobile motor has been provided for attachment to the accelerator pedal of automobiles in the past. Such controls have been of the type in which the maximum amount of fuel that can be supplied the motor is rigidly fixed and cannot be changed to meet an emergency, or they have to be recalibrated by the automobile operator after each change of speed.

The advantages of a maximum limit control for the accelerator pedal of an automobile are particularly appreciated by motorists who drive on long trips. When the limit control is set for the approximate maximum legal speed limit of a highway, the accelerator pedal acts as a foot rest, relieving the operator from fatigue during long periods of time when the automobile may be driven at the maximum speed of the highway. The limit control also insures that the driver will not inadvertently operate the automobile at excessive speed, and it eliminates the need for constantly checking the speedometer and making adjustments in the amount of depression of the accelerator pedal on stretches of clear highway.

It will be readily seen, however, that emergencies will arise where it is necessary to accelerate the automobile beyond a fixed limit to which the control may be set, as for a stretch of very hilly road and for meeting emergencies in city traffic. To meet emergencies of one type it would be desirable to quickly but temporarily disengage the limit control but have it automatically return to engagement as soon as the emergency has passed. In other cases, it may be desirable, as on short local trips, to eliminate all limiting of the accelerator pedal.

Consequently, it is an object of the present invention to provide an accelerator limit control having means for quickly disengaging the control to meet an emergency by mere shifting of the foot to a release carried on the accelerator pedal; and, when the emergency has passed, the control will automatically return to its previous setting.

Another object of the present invention is to provide an accelerator limit control having means for quickly calibrating the setting of the control with the maximum speed desired as shown by the speedometer when the automobile has been accelerated to that speed.

A still further object of the present invention is to provide a limit control for the accelerator pedal of an automobile having means operable by the foot of the operator to disengage the limit control, so that the pedal may be used without limit control where traffic conditions or the grade of the road would require excessive use of the emergency release.

Other objects and advantages of the present invention will become apparent from the following description of one practical embodiment of the invention when read in conjunction with the accompanying drawings, wherein.

The accelerator limit control of the present invention may be made integral with the accelerator pedal furnished for installation on an automobile in the course of manufacture at the factory, or it may be furnished as a kit for installation on any automobile having the usual type of accelerator pedal. It is with respect to the latter embodiment that this invention will be described.

Figure 1:
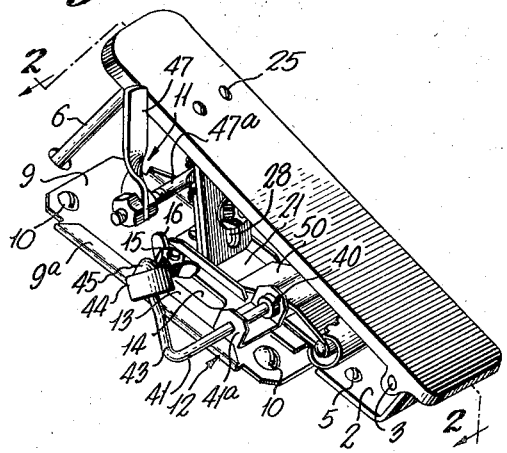
Figure 1 is a perspective view of an automobile accelerator pedal incorporating the limit control of the present invention.
Figure 2:
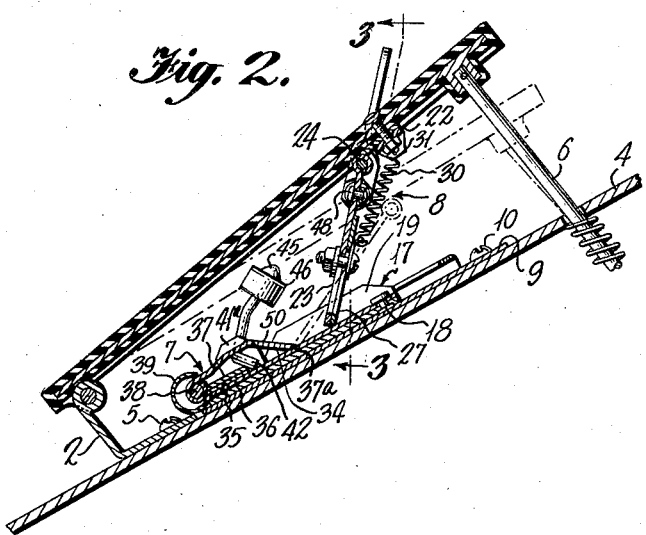
Figure 2 is a longitudinal sectional view taken on the line 2—2 of Figure 1.

Adverting now to the drawings, and more particularly to Figures 1 and 2, there is shown an automobile accelerator pedal 1 mounted on a bracket 2 to which it is pivotally connected by a hinge pin 3, the bracket 2 being fastened to the floor of the automobile 4 by means of bolts 5. A rod 6 is dependingly attached near the front end of the pedal 1 and passes through the floorboard 4 to connect with the linkage (not shown) of a fuel supply means of an automobile, in well-known manner.

The present invention when provided as a kit, consists of two cooperating assemblies: A slider assembly 8 to be attached to the pedal 1; and a stop assembly 7 to be attached to the floorboard 4 beneath the pedal 1.

The base piece 9 of the stop assembly 7, conveniently made of suitable-gauge sheet metal, is mounted on the floorboard 4 by the bolts 10 and extends longitudinally beneath the central portion of the pedal 1, as shown in Figure 2. Thes base piece 9 is wider than the pedal 1 and is installed with the edge 11 outward from the operator's position in the automobile and aligned vertically with the corresponding edge of the pedal 1. The opposite edge 12 extends from beneath the side of the pedal 1 for a purpose to be later described.

An adjustment platform 13 which may be made of similar material as the base piece 9 is slidably mounted on the base piece 9 in superposed relation. The adjustment platform 13 is as wide as the base piece 9 and approximately one-half its length. A U-bend 9a, formed on the base piece 9 provides a groove in which the adjustment platform 13 is slidably seated. A longitudinal slot 14 extends along most of the length of the adjustment platform 13 adjacent the U-bend 9a. A bolt 15 anchored in the base piece 9 is received in the slot 14 for adjustably attaching the adjustment platform 13 to the base piece 9 by means of the nut 16 which may conveniently be a wing nut. Since the bolt 15 is near the edge 12 of the base piece 9, the wing nut is readily accessible for making adjustments to the adjustment platform 13, by sliding said platform relative to said bolt which lies outward of the pedal 1.

Figure 3:
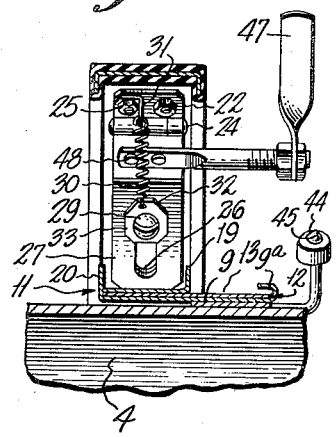
Figure 3 is a transverse sectional view taken on the line 3—3 of Figure 2.
Figure 4:
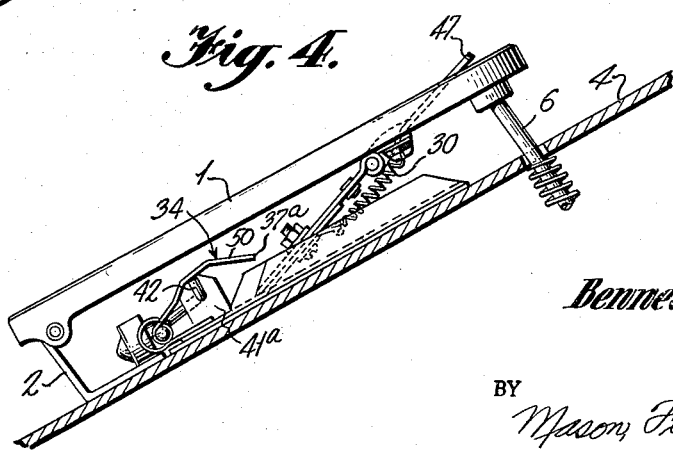
Figure 4 is a side elevation of the accelerator pedal with limit control released and the pedal in fully depressed position.

A skid 17 which also may be made of sheet metal is of the approximate width of the pedal 1 and is mounted on the adjustment platform 13 in vertical alignment with the pedal 1 by means of the rivets 18. A flange 19 is upturned on the inner edge of the skid 17, and an opposing flange 20 is upturned on the edge 11 of the base piece 9, as shown in Figure 3, so that the bed portion 21 of the skid 17 lies therebetween.

The slider assembly 8 comprises a mounting plate 22 and a slider 23 hingedly connected by the hinge pin 24. The mounting plate 22 is fixedly attached to the underside of the forward end of the pedal 1, in the embodiment used for illustration, by bolts 25. The outer end of the slider 23 rests on the bed 21 of the skid 17. The slider 23 assumes the position of a sliding taper with respect to the bed 21; that is to say, it is of such length that it will not become a brace for pedal 1, and to avoid this, the angle of contact of the slider 23 with the bed 21 should be a small angle so that the slider 23 will freely slide along the bed 21 when the pedal 1 is depressed.

Since the distance between the pedal 1 and the floorboard 4 is variable among the several makes of automobiles and even in models of the same make, the length of the slider 23 may be made extensible. For this purpose, a longitudinal slot 26 is provided in the slider 23, and a slider extension plate 27 having a longitudinal slot 28 of similar length and size as the slot 26 is adjustably fastened to the slider 23 by means of the bolt 29 which is passed through the respective slots. The slider 23 and the slider extension plate 27 may then be adjustably attached together so that a sliding contact between the slider 23 or its extension plate 27 and the bed 21 may be obtained. A spring 30 having one end fastened to an ear 31 struck on the mounting plate 22 and the other end fastened to an extension 32 of a washer 33 mounted on the bolt 29 of the slider 23 biases the slider 23 toward the bed 21 of the skid 17.

A stop 34 is mounted near the rear of the skid 17. The stop 34 consists of a mounting plate 35 fixedly attached to the skid 17 with the rivets 36. An arm 37 is hinged to the plate 34 by a hinge pin 38, so that it may swing to and from the skid 17. The arm 37 is bowed, as shown in Figure 2, so that only its front edge 37a is in contact with the skid 17, and lies transversely across the said skid. The arm 37 is made of heavy gauge metal, so that the edge 37a will effectively block the path of travel of the slider 23 and prevent further depression of the pedal 1. A plate spring 39 is provided to bias the arm 37 toward the skid 17.

The platform 13 may be adjusted by loosening the wing nut 16 and moving the platform 13 which carries the stop 34 until the edge 37a of the arm 37 is positioned in the path of travel of the slider 23 at a point in the deflection of the pedal 1 where the speed of the automobile would be maximum desired speed. The wing nut 16 is then re-tightened. The slider 23 will freely move along the skid 17 until it reaches the abutment edge 37a of the arm 37 so that any degree of acceleration may be obtained up to the maximum setting of the stop 34. When the slider 23 is in abutment with the arm 37 of the stop 34, the slider 23 becomes a truss member to hold the pedal 1 against the further downward movement.

A throw-out 40 may be provided to lift the arm 37 out of engagement with the skid 17, thereby allowing the slider 23 to pass freely under the arm 37 and the accelerator pedal is made unlimited in its operation. The shaft 41 of the throw-out 40 is journaled in a pair of upstanding ears 41a mounted on the platform 13 beside the arm 37. One end of the shaft 41 is turned at right angles to the said shaft to form a cam 42 which extends under the bowed portion of the arm 37. When the cam 42 is in horizontal position it lies within the bow of the arm 37, but when it is turned to a vertical position it cams the arm 37 above the skid 17 so that the slider 23 may pass freely beneath it.

A foot-operated trigger 43 is formed on the shaft 41 by up-turning the outer end of said shaft at a right angle. The trigger 43 extends radially at a right angle to the direction of the cam 42. A shoe engaging knob 44 is provided for the outer end of the trigger 43. The knob 44 is made of soft rubber or other high-friction material and is of circular cross-section. A cone 45 of like material rises from the center of the outer end of the knob 44. The base of the cone 45 is of smaller circumference than that of the knob 44, leaving a shoulder 46 on the knob 44.

The trigger 43 is swingable in an arc of about 120°, although the effective camming action of the cam 42 is accomplished by moving the cam 42 through an arc of approximately 90°. The distance from the skid 17 at which the shaft 41 is journaled provides the additional turning moment of the cam 42 and the trigger 43. To disengage or re-engage the limit control of the present invention, the operator of the automobile need only wipe the sole of his shoe across the trigger knob 44 in a rearward or forward direction, respectively. The sole of the operator's shoe first contacts the shoulder 46 of the knob 44, to begin rotation of the trigger 43. Next, the cone 45 engages the sole of the shoe as the wiping motion continues. Finally, the shoulder 46, on the side of the knob 44 opposite the first contact of the shoe sole with the shoulder 46, engages the shoe sole to turn the cam 38 in each respective direction beyond dead-center.

In emergencies, when it is necessary to quickly supply the motor of the automobile with a greater fuel supply than is possible when the limit control is in operation, an emergency relief treadle 47 is provided. The relief treadle 47 is mounted on the shaft 47a and is fixedly attached to the slider 23 by means of the rivets 48 just below the hinge pin 24. The treadle 47 is positioned to lie in approximately the same plane as the slider 23, thereby becoming an offset extension of the slider 23, but extending in an opposite direction therefrom. The treadle 47 lies to one side of the pedal 1, as shown in Figure 1, and extends above the top of the pedal 1. When the treadle 47 is depressed to the level of the pedal 1, it is in release position. The operator can conveniently shift his foot so that the pedal 1 and the treadle 47 are included under his foot at the same time. Pressure on the treadle 47 raises the slider 23 over the abutment ledge 37a so that it will ride up the inclined upper surface 50 of the bow of the arm 37, and the pedal 1 may be depressed as far as desired. When the emergency has passed, the operator removes his foot from the treadle 47, and when the pedal 1 is allowed to rise until the slider 23 is again in contact with the skid 17, the limit control is again in operation without requiring the attention of the operator.

In use, the wing nut 16 is first loosened, and the platform 13 is advanced until the abutment edge 37a of the arm 37 is in abutment with the slider 23. With the wing nut 16 not tightened, deflection of the pedal 1 will cause the platform 13 to be moved in a rearward direction. The automobile may then be accelerated to the maximum speed at which it is desired to set the limit control. The automobile may then be stopped and the wing nut 16 can then be tightened to place the limit control in operation.

The uppermost portion of the U-bend 9a may be utilized for inscribing indicia (not shown) for calculating the position of the platform 13 for selected speeds at which the accelerator is to be limited.

While I have in the above description disclosed what I believe to be a practical embodiment of the invention, it will be understood by those skilled in the art that the specific details of construction and arrangement of parts are by way of example and not to be construed as limiting the scope of the invention.

What is claimed is:

1. Limit control for attachment to the accelerator pedal for limiting the maximum speed of an automobile comprising, a skid fixedly mounted on the floorboard of the automobile beneath the accelerator pedal, a slider pivotally connected at one end to the accelerator pedal and having its opposite end slidably engaging said skid at a small angle, said slider being biased toward said skid for free sliding back and forth movement on said skid relative to the movement of the accelerator pedal, an abutment mounted relative to said skid in the path of movement of said slider to limit the amplitude of free sliding movement of said slider on said skid and the amplitude of movement of the accelerator pedal, and means for diverting said slider away from said abutment to restore to full amplitude of movement of said slider and said accelerator pedal.

2. Maximum limit control for attachment to the accelerator pedal for limiting the maximum speed of an automobile comprising, a skid fixedly mounted beneath the accelerator pedal, a slider dependingly hinged at one end to the accelerator pedal for sliding movement along said skid when the accelerator pedal is depressed, an abutment mounted adjacent said skid and positioned in the path of movement of said slider on said skid, said abutment being a bowed arm having an end biased into contact with said skid, means for positioning said abutment at any selected point in the path of travel of said slider to reduce the amplitude of movement of said slider and accelerator pedal, a release for moving said one end of said bowed arm away from said skid whereby the movement of said slider is restored to its full amplitude along said skid, emergency means operative at will for deflecting said slider away from said abutment and said skid and said abutment being surmountable by said idler for returning said slider onto said skid when said emergency means is inoperative.

3. In combination with the accelerator pedal of an automobile, a bed plate adapted to be mounted on the floor board of the automobile beneath said accelerator pedal, a stop on said bed plate, a slider hingedly mounted on the underside of said pedal inclined toward said stop and slidably engageable with said bed plate when said pedal is depressed, said stop being in the path of movement of said slider, said slider forming a strut to limit the extent of depression of said pedal when in engagement with said stop, and emergency release means on said pedal operable at will for disengaging said slider from said stop.

4. In combination with the accelerator pedal of an automobile, a bed plate adapted to be mounted on the floor board of the automobile beneath said accelerator pedal, a stop on said bed plate, a slider hingedly mounted on the underside of said pedal inclined toward said stop and slidably engageable with said bed plate when said pedal is depressed, said stop being in the path of movement of said slider, said slider forming a strut to limit the extent of depression of said pedal when in engagement with said stop, emergency release means on said pedal operable at will for disengaging said slider from said stop, and throwout means on said bed plate for disengaging said stop from said bed plate.

5. In combination with an automobile accelerator pedal having a normal amplitude of movement in use between substantially throttle shut-off position and full throttle position, a slider having an end hingedly mounted on the underside of said pedal and a free end biased away from said pedal, a bed plate adapted to be installed on the floor board of an automobile beneath said accelerator pedal, said free end of said slider being in sliding engagement with said bed plate, said slider and said bed plate forming a small angle between them at their point of engagement whereby the free end of said slider will move back and forth in a path on said bed plate in a reciprocatory range proportional to the up and down reciprocatory range of said accelerator pedal in use, a stop interposable on said bed plate in the path of movement of said free end of said slider to shorten the amplitude of the back and forth reciprocation of said free end of said slider, relief treadle on said pedal operable at will for disengaging said slider from said stop to restore the normal amplitude of movement to said accelerator pedal.

6. In combination with an automobile accelerator pedal having a normal amplitude of movement in use between substantially throttle shut-off position and full throttle position, a slider having an end hingedly mounted on the underside of said pedal and a free end biased away from said pedal, a bed plate adapted to be installed on the floor board of an automobile beneath said accelerator pedal, said free end of said slider being in sliding engagement with said bed plate, said slider and said bed plate forming a small angle between them at their point of engagement whereby the free end of said slider will move back and forth in a path on said bed plate in a reciprocatory range proportional to the up and down reciprocatory range of said accelerator pedal in use, a stop interposable on said bed plate in the path of movement of said free end of said slider to shorten the amplitude of the back and forth reciprocation of said free end of said slider, relief treadle on said pedal operable at will for disengaging said slider from said stop to restore the normal amplitude of movement to said accelerator pedal and a release on said bed plate operable at will for disengaging said stop from said bed plate.

7. In combination with the accelerator pedal of an automobile, a slider having one end hingedly mounted on the underside of said accelerator pedal and a free end biased away from said pedal, a bed plate adapted to be fixedly installed on the floor board of an automobile beneath said accelerator pedal, a skid adjustably mounted on said bed plate, said free end of said slider being in sliding engagement with said skid, said slider and said skid forming a small angle between them at their point of engagement whereby the free end of said slider will move back and forth in a path on said skid at an amplitude of reciprocating movement proportional to the amplitude of reciprocating up and down movement of said accelerator pedal in use, a stop plate having a ledge to confront the free end of said slider in abutting relation and pivotally hinged to swing to and away from engagement with said skid, a release lever on said skid for moving said stop plate to and away from said skid, and an emergency relief treadle adjacent said accelerator pedal operable at will simultaneously with said accelerator pedal to divert said slider away from said abutting ledge of said stop to extend the amplitude of movement of said slider.

References Cited in the file of this patent

UNITED STATES PATENTS

| | | |
|---|---|---|
| 1,205,577 | Steglich | Nov. 21, 1916 |
| 1,206,673 | Cobb | Nov. 28, 1916 |
| 2,224,600 | Howard | Dec. 10, 1940 |